(12) United States Patent
Costinel

(10) Patent No.: US 6,588,601 B1
(45) Date of Patent: Jul. 8, 2003

(54) APPARATUS FOR REMOVING FINES FROM OIL TANKS

(75) Inventor: Paul Costinel, Edmonton (CA)

(73) Assignee: Canadian Enviromental Equipment & Engineering Technologies Inc., Alberta (CA)

(*) Notice: Subject to any disclaimer, the term of this patent is extended or adjusted under 35 U.S.C. 154(b) by 0 days.

(21) Appl. No.: 09/548,775

(22) Filed: Apr. 13, 2000

Related U.S. Application Data

(60) Provisional application No. 60/129,629, filed on Apr. 16, 1999.

(51) Int. Cl.[7] ............................. B08B 3/02; B01D 21/26
(52) U.S. Cl. ................ 210/406; 210/416.1; 210/512.1; 210/519; 210/532.1; 134/21; 134/22.12; 15/300.1
(58) Field of Search ................. 134/21, 22.12; 210/406, 416.1, 512.1, 519, 532.1; 15/300.1

(56) References Cited

U.S. PATENT DOCUMENTS 4,859,323 A * 8/1989 Rolfvondenbaumen .. 210/512.1
5,582,652 A   12/1996 Robertson et al. ....... 134/22.18

FOREIGN PATENT DOCUMENTS

| GB | 395728 | * | 7/1933 | |
| GB | 2177291 A | * | 1/1987 | ............. B08B/9/08 |
| WO | WO 00/62948 A1 | * | 10/2000 | |

* cited by examiner

Primary Examiner—David A. Reifsnyder
(74) Attorney, Agent, or Firm—Swanson & Bratschun, L.L.C.

(57) ABSTRACT

An apparatus for removing fines from the bottom of a tank includes an extraction device having an internal chamber along with a vacuum arrangement which, when activated, lowers the pressure within the chamber. An inlet structure adjacent the bottom of the extraction device is adapted to be juxtaposed against fines accumulated on the bottom of the tank, the inlet device acting, when the vacuum is activated, to move fines toward the internal chamber by superimposing on the moving fines an inwardly convergent motion. A cable is provided for lowering the extraction device toward the bottom of the tank. The apparatus includes a distributor above the extraction device. The distributor defines a quiet zone above the device for separation of fines from the fluid.

13 Claims, 12 Drawing Sheets

APPARATUS FOR REMOVING FINES FROM OIL TANKS

This application claims the benefit of Provisional Application Ser. No. 60/129,629, filed Apr. 16, 1999.

FIELD OF THE INVENTION

This invention relates to a method and apparatus for the evacuation of settled solid materials from the base of field storage tanks used primarily in the oil industry or from vessels employed in chemical downstream processing of heavy crude oil. More specifically, the present invention relates to a de-sanding method and arrangement which utilizes an apparatus for the formation and evacuation of slurries and preferably a storage tank for recovering the contaminated water. The water is re-used in the process and subsequently treated for minimizing consumption and the risk of pollution.

BACKGROUND OF THE INVENTION

A method for removing fines, such as sand from a crude oil tank is described in U.S. Pat. No. 5,582,652 issued to Robertson et al. The method discloses a process of directing a fluid into the bottom of a tank by means of a coiled pipe to stir up in an uncontrolled manner the fines and create thereby a slurry that can be evacuated from the tank. The second step consists of drawing the slurry through a drain pipe and pumping it into the bed of a truck where the sand is retained for disposal and the liquid is re-circulated.

The method is ineffective in removing the sand from the periphery of the tank due to the fact that the drainpipe is placed transversely across the tank and can reach only a limited area in the vicinity of the pipe. Thus the drainpipe cannot take advantage of the special construction of the inlet line that is designed to distribute uniformly the liquid in the lower region of the tank. Moreover, uniform distribution of the fluidizing liquid cannot be achieved throughout the tank as intended. The diameter of the orifices is the same along the pipe and most of the liquid will tend to exit at one end of the pipe i.e. the central portion of the coil. The supply line orifices are quite small being subjected to intensive erosion that tends to enlarge them and reduce their effectiveness in creating the slurry. At the same time the orifices in the supply line form eddies that tend to emulsify the oil globules circulating through the pipe with the water. The emulsified oil cannot be readily separated within the truck bed contaminating the water employed for slurry creation. This has an undesirable effect on the sand that is recovered from the bottom of the tank and poses a disposal problem both for the water and the sand. The contaminated water that needs to be replaced in order to continue the de-sanding process may be in short supply in certain locations. The slurry also contains fines such as clay that cannot be separated in the bed of the truck because their relative density is very close to the density of water. Consequently the fines in the form of clay also contaminate the water compounding the problem created by the emulsified oil and requiring costly replacement of water.

At the same time no provision is made to isolate the crude oil from the vicinity of the drainpipe and a certain amount of oil is entrained with the slurry resulting in wastage of crude oil and contamination of the water used for slurry formation. The line that supplies liquid for stirring up the fines is prone to clogging and, in order to eliminate the clogging, the de-sanding process must be interrupted with undue downtime.

Prior art methods for removing the fines from crude oil tanks have made no attempt to deposit the fines in a manner that is advantageous for evacuation.

SUMMARY OF THE INVENTION

It is therefore an object of an aspect of the present invention to provide an effective method for introducing the crude oil into the holding tank in a fashion that facilitates the sedimentation of the fines mostly in the central region of the tank from where they can be readily removed. This may be achieved in two steps by means of reversing the flow of crude oil in a distributor that absorbs the impact of the fluid entering the tank and then forming a vortex in the lower part of the distributor that is specially designed for this purpose. The distributor is part of a bell shaped apparatus and promotes the flow of liquid in a circular motion that causes the fines to migrate towards the eye of the vortex and settle in the central area of the tank.

It is also an object of an aspect of the invention to provide a method for circulating the fluidizing liquid through the lower portion of the tank without entraining oil in the slurry suction line. The fines are removed by means of a bell shaped device that is lowered onto the surface of the fines. The bell is then flooded with water that displaces the oil from the area under the bell and provides an optimal medium for slurry formation. In addition to isolating the oil from the fluidizing area, the bell also ensures a quiet zone above the de-sanding region preventing the oil from being re-entrained into the bell.

It is also the object of an aspect of the invention to provide an apparatus for fluidizing and removing the sand from the central region of the tank with minimal disturbance and no emulsification. The apparatus comprises an impeller shaped extraction device that causes a swirling motion of the liquid in its vicinity. The swirling motion causes the sand around the apparatus to migrate towards the extraction device. A specially designed inlet at the lower part of the extraction device allows the sand from the area directly below the apparatus to be removed through the suction action of the apparatus. A modified jet pump placed within the central portion of the extraction device forms a vacuum that is uniformly distributed in the lower portion of the de-sanding apparatus. The slurry is then discharged from the tank for processing in a centrifuge.

It is an object of another aspect of the invention to provide a method for removing the fines at a constant rate for preventing turbulence and the overloading of the system. The displacement of the fines causes the slurry extraction device to descend due to gravity and enables it to gradually reach lower areas of the sand sediments. The sand deposit therefore needs agitation only at its surface whereas lower layers remain undisturbed. Consequently the jets employed in removing the upper layer of sand may be relatively weak further minimizing sand disturbance. Meanwhile the sand layers are removed through the downward motion of the de-sanding apparatus that descends due to its own weight. The displacement of an upper layer of sand allows the apparatus to reach the layer immediately below. Due to the fact that the weight of the bell and the flow rate of the fluidizing liquid are constant the slurry concentration also remains relatively constant during the de-sanding process with beneficial effects on the pump and the de-watering device.

It is also an object of an aspect of the invention to provide a method for causing the sand to migrate towards the centre of the tank with negligible agitation of the fluid. This is accomplished by means of distributing uniformly the fluidizing liquid throughout the bottom of the de-sanding apparatus and directing the flow towards the central region of the tank by means of specially designed flow-diverting baffles. The fluidizing liquid has a gentle sweeping action and the sand migrates with minimal agitation and at a constant rate for removal. The de-sanding apparatus tends to form a cavity in the central area of the bell that facilitates the migration of sand from the periphery of the tank.

It is also an object of an aspect of the invention to provide means of fluidizing the fines on the periphery of the tank, the means being resistive to clogging and not causing eddies with inevitable emulsification. The lower portion of de-sanding apparatus has a circular distribution chamber with equally spaced outlet ports. The outlet ports are in fluid communication with nozzle shaped check valves made from elastomers. The duckbill feature of the valve allows the process of free flow in one direction and provides reliable backflow prevention. The nozzles cannot become plugged and undue downtime due to clogs is avoided during the de-sanding process. The nozzle shaped check valve creates a jet that directs the sand towards the centre of the de-sanding apparatus for disposal. The apparatus is placed onto the sand surface slowly by means of a counterweight. This minimizes the impact and prevents the nozzles from being buried in the sand. Consequently the flow through the nozzles remains constant and so does the strength of the jets generated by the nozzles. This ensures an effective sweeping action of the jets without undue disturbance of the sand layers. Moreover, if the nozzles do get buried inadvertently, the pressure exerted by the sand reduces the aperture of the nozzles. Consequently the velocity of the liquid exiting the nozzles is increased and the liquid has an enhanced force for removing the sand from the vicinity of the nozzles. It can be seen that the nozzles are capable of freeing themselves from sand by generating stronger jets when they become buried inadvertently and then readjusting the strength of the jets for optimal performance.

It is also an object of an aspect of the invention to provide an effective method for separating the water from the sand prior to loading the sand into a truck or depositing it for subsequent disposal. A centrifuge well known in prior art may be employed for de-watering the sand and re-circulating the water to the crude oil tank for resuming the de-sanding process. The centrifuge is very effective in separating the water from sand and most of the water returns to the crude oil tank.

It is also an object of an aspect of the invention to provide a method for minimizing the water necessary for the de-sanding process. After fluidizing the sand and being separated from the slurry by the centrifuge, the water is recirculated and undergoes a gravity separation process in the area under the de-sanding apparatus where it releases the oil that may contaminate the fluidizing water. The oil-water separation is assisted by the coalescing effect of the perforated plate of the de-sanding apparatus. The oil then reaches the quiet zone above the de-sanding apparatus and is prevented from being re-entrained in the fluidizing water. The resulting relatively clean water can then be effectively reused for slurry formation.

An object of another aspect of the invention is to provide means for effectively removing the clay from the crude oil tank and water storage tank. The fines that have a relative density very close to that of the fluidizing water cannot be removed during the de-sanding process. However, upon completion of the de-sanding sequence, the water is returned to a water storage tank where it is subjected to gravity separation. Due to sufficient retention time, the fines slowly deposit themselves in the lower region of the tank. The buildup of clay is monitored by means of an optical sensor that initiates a sequence for the automatic removal of clay. Sand that may be transferred from the crude oil tank to the water holding tank is removed in a similar manner when sand accumulation is detected by means of a radioactive sensor.

It is still another object of an aspect of the invention to provide a system formed by a crude oil tank placed in series with another crude oil tank. The system is designed to pass the crude oil through the de-sanding tank for gravity separation of fines. Due to sufficient retention time most of the fines are retained in the crude oil tank for removal through an automatic de-sanding process. The crude oil is then directed to adjacent crude oil tanks for storage. It should be appreciated that there is a negligible amount of fines reaching other tanks in series with the de-sanding tank. The latter do not need a de-sanding system such as the one disclosed above resulting in important savings in terms of equipment costs. The fines that may be carried to other tanks can be removed during the scheduled maintenance of the crude oil tanks.

The present invention contemplates, in a preferred aspect, an electrical control to initiate, monitor and end automatically the de-sanding process in order to ensure the recovery of the fluidizing liquid, the removal of fines from the water storage tank, and automatic replenishing of the water tank.

More particularly, this invention provides an apparatus for removing fines from the bottom inside of a tank, comprising:

an extraction device having wall means defining an internal chamber, vacuum means within the chamber which, when activated, lowers the pressure within the chamber, an inlet device adjacent the bottom of the extraction device, the inlet device being adapted to be adjacent fines accumulated on the bottom of the tank, the inlet device acting, when the vacuum means is activated, to move fines toward the internal chamber by superimposing on the moving fines an inwardly convergent motion, and operating means for 1) lowering the extraction device toward fines accumulated on the bottom of the tank, and 2) activating the vacuum means.

Further, this invention provides an apparatus for removing fines from the bottom inside of a tank, comprising:

an extraction device adapted to be adjacent fines accumulated on the bottom of the tank, and to remove the fines along a pathway by creating a vacuum effect;

a distributor within the tank and vertically aligned above the extraction device, the distributor having:

a distributor wall means defining an enclosed distributor space, ducting conduit means for ducting fluid to the enclosed distributor space, said ducting conduit means having at its downstream extremity, within said enclosed distributor space, an outwardly flared portion the effect of which is to decrease the speed with which the fluid enters the enclosed distributor space;

a vortex generating means by which fluid in the distributor is discharged therefrom in a swirling motion to facilitate the separation of fines from the fluid.

Finally, this invention provides a method of removing fines from the bottom inside of a tank, comprising the steps:

providing an extraction device employing the jet pump effect to create a vacuum which, when the device is adjacent the fines, draws the fines into a discharge pathway that directs them out of the tank;

suspending the extraction device above the bottom of the tank, lowering the extraction device toward and into contact with the fines, and energizing the extraction device to remove the fines from the tank.

BRIEF DESCRIPTION OF THE DRAWINGS

The various embodiments of the present invention are illustrated in the appended drawings wherein.

DETAILED DESCRIPTION OF THE PREFERRED EMBODIMENT

The operation of the invention will be described in the context of removing sand from the crude oil tank. However the method and apparatus of the invention may be used to remove other phases having different densities as will be apparent from the following explanation.

Figure 1:
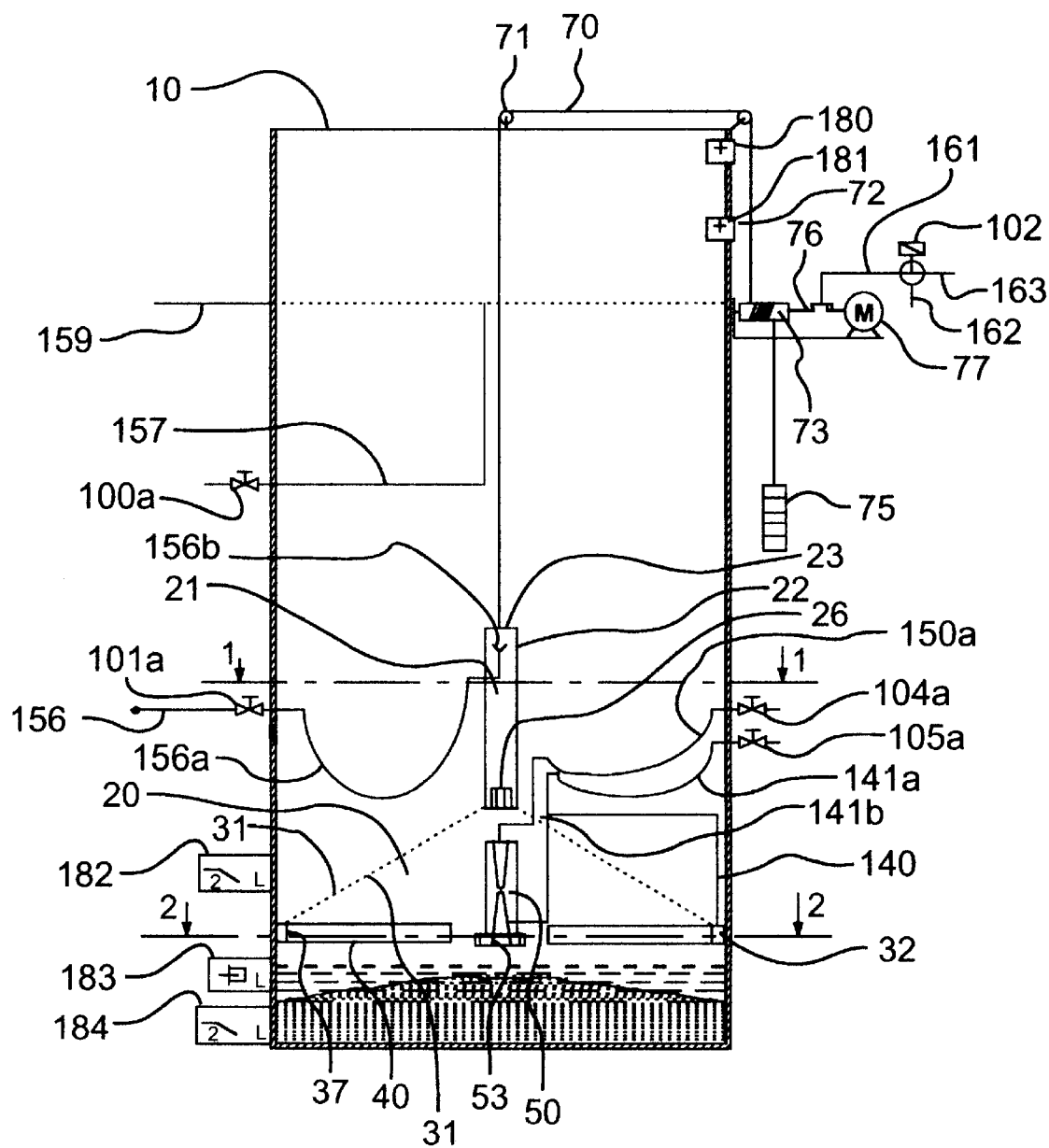
FIG. 1 is an elevational section through the de-sanding apparatus according to the invention.

As shown in FIG. 1 crude oil contaminated with sand enters the tank through inlet valve 100 and pipe 156. Inlet pipe 156 is in fluid communication with distributor 21. Valve 101a isolates tank 10 from conduit 156. Conduit 156 has a flexible portion 156a, which allows the free movement of the de-sanding apparatus 20 in a vertical path. Conduit 156 also enters distributor 21 being bent upwards to direct the flow of the liquid to the top of distributor 21 and has an enlarged end 156b that reduces the velocity of the fluid. The oil flow is reversed in distributor 21 which is generally vertically disposed and has a cylindrical wall 22, a circular top 23 and a vortex generator 26 at the bottom of the distributor 21. Top 23 of distributor 21 may be flat or convex and is welded to the cylindrical sidewall 22 absorbing the impact of the liquid that enters distributor 21 prior to deflecting it downwards.

Figure 2:
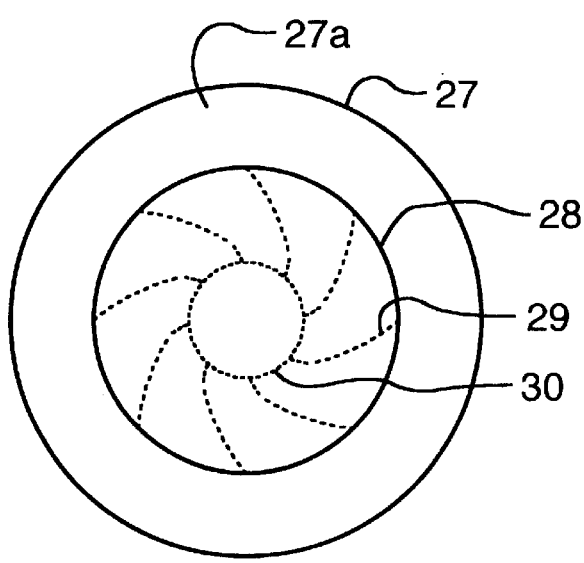
FIG. 2 is a sectional view taken along line 1—1 of FIG. 1 showing the vortex-forming device of the distributor.

Referring to FIG. 2, the bottom plate 27 is also welded to cylindrical wall 22 and partly encloses distributor 21 which is in fluid communication with the lower portion of the de-sanding apparatus 20 through circular aperture 30. The diameter of cylindrical wall 22 is in the order of magnitude of one tenth of the diameter of tank 10 and the height of the wall 22 is preferably about one fifth of the height of tank 10.

The liquid flows downwards and reaches the lower part of the distributor 21 where it is imparted a rotary motion by vortex generator 26. The upper portion of vortex generator 26 is formed by a circular plate 28 with a diameter that is approximately one third smaller than the diameter of the distributor 21. A plurality of curved blades 29 converges towards the centre of distributor 21 being welded to plate 28. Plate 28 and blades 29 are welded to circular plate 27 that encloses the vortex generator 21. The liquid enters the vortex generator 26 through the annular space 27a and exits through aperture 30. The resulting swirl facilitates the separation of sand from oil and the sedimentation of sand in the central region of tank 10. Further gravity separation takes place in the lower portion of the de-sanding apparatus 20 that comprises a frusto-conical perforated plate 31 shown in FIG. 1 that has a diameter slightly smaller than the diameter of the tank 10. The upper portion of the perforated plate 31 is welded to the bottom of the cylindrical wall 22 of distributor 21. Plate 31 has two orifices for allowing conduits 150 and 141 to be connected to extraction device 50 so that extraction device 50 can move relatively to extraction apparatus 20. The flow of liquid is reversed in the lower portion of the perforated plate 31, thus being directed upwardly. Perforated plate 31 permits the liquid to move into a quiet zone 31a above the de-sanding apparatus 20. The quiet zone produced by perforated plate 31 facilitates further gravitational separation of sand from oil. Sand falls through the perforations of plate 31 and deposits at the bottom of tank 10 in the space enclosed by de-sanding apparatus 20.

Clean crude oil leaves tank 10 through overflow pipe 157 and outlet valve 157 and it is stored in adjacent crude oil tanks (not shown). Conduit 157 has its open end in the upper middle portion of tank 10 so that water from tank 160 cannot accidentally reach other tanks in series with tank 10 through conduit 157. Sediments deposited towards the periphery of tank 10 are displaced towards the centre of tank 10 for evacuation by means of jets generated by a plurality of nozzles 38.

Figure 5:
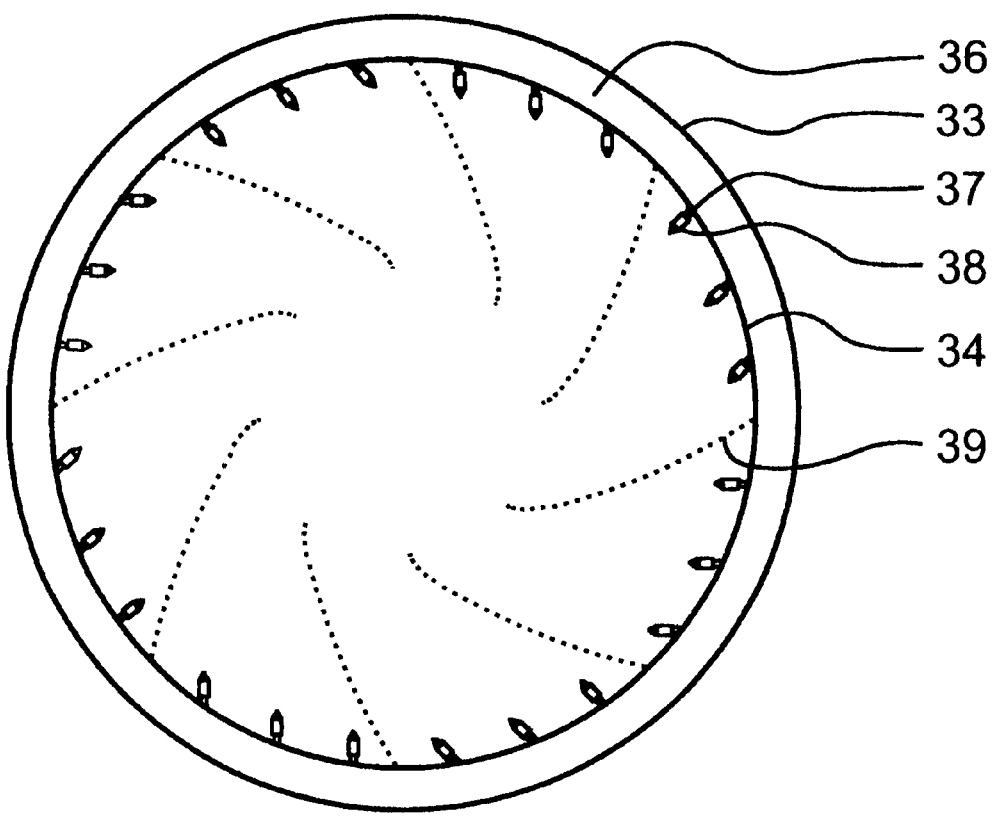
FIG. 5 is a sectional view along line 2—2 of FIG. 1 showing the impeller shaped baffles, the nozzle distribution chamber and the non-clogging nozzles of the de-sanding apparatus according to the invention.
Figure 5A:
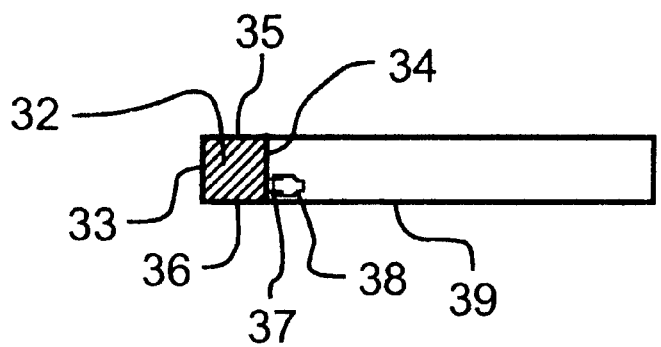
FIG. 5a is a partly elevational section through the distribution chamber.

As shown in FIGS. 5 and 5a nozzles 38 are generally equally spaced and placed laterally along distribution chamber 32 at the bottom of de-sanding apparatus 20. Nozzles 38 are secured to pipes 37 and are made from elastomeric material. In effect nozzles 38 are check valves of duckbill design well known in prior art allowing the free flow of liquid in one direction and providing reliable backflow prevention.

Nozzles 38 provide generally horizontal jets that displace the sand between blades 39 towards the centre of tank 10 being supplied with liquid under pressure from distribution chamber 32. Distribution chamber 32 is in fluid communication with nozzles 38 through pipes 37 and distributes uniformly the fluidizing liquid to nozzles 38. Distribution chamber 32 is also in fluid communication with pump 120.

Distribution chamber 32 has an outer cylindrical wall 33 placed concentrically with inner wall 34. The height of outer wall 33 and inner wall 34 is in the order of magnitude of one tenth of the height of frusto-conical plate 31. The upper portion of distribution chamber 32 is enclosed by annular plate 35 whereas annular plate 36 encloses the bottom of chamber 32. Plate 35 and plate 36 are welded to outer cylindrical wall 33 and inner cylindrical wall 34 making distribution chamber 32 a generally enclosed space. Blade 39 has a generally rectangular shape with an end welded to inner wall 34 of distribution chamber 32 and the other end extending radially towards the centre of the tank 160 as shown in FIG. 5 and FIG. 5a. Blade 39 is curved and the free end of bade 39 converges towards the extraction device 50 conveying the slurry for evacuation.

Figure 3:
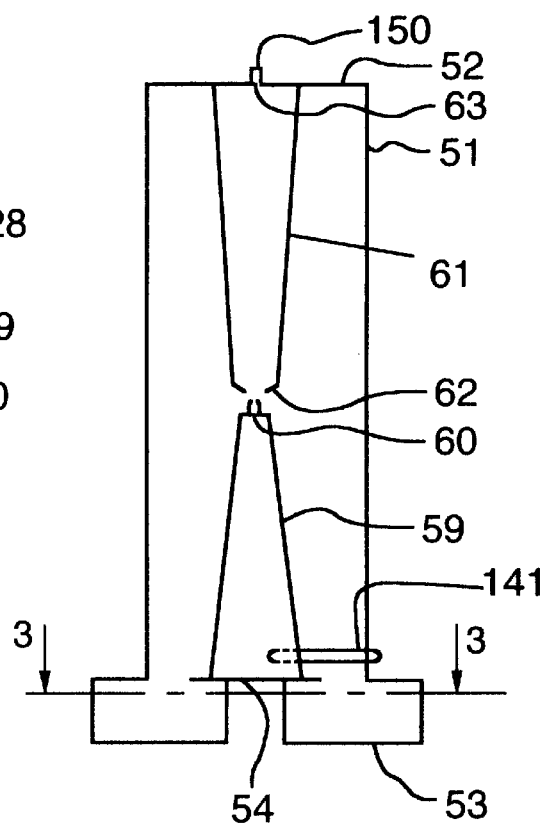
FIG. 3 is an elevational section through extraction device.

Extraction device 50 shown in FIG. 3 is a modified jet pump with an outer casing formed by cylinder 51. The upper end of cylinder 51 is welded to circular plate 52, the latter closing extraction device 50 at its upper end. The lower part of cylinder 51 comprises a specially designed inlet device 53 for admitting the slurry into the extraction device 50.

Figure 4:
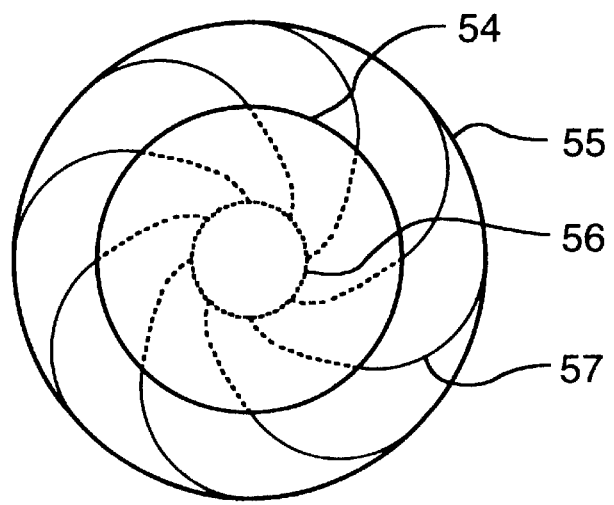
FIG. 4 is a sectional view along line 3—3 of FIG. 3 showing the configuration of the inlet device of the extraction device.

As shown in FIG. 4, inlet device 53 has a circular plate 54 at the upper portion and a circular plate 55 at the lower portion with an aperture 56 for admitting sand into the extraction device 53 from the region immediately below the inlet device 53. Rectangular blades 57 are curved and converge towards the aperture 56 being welded between upper plate 54 and lower plate 55. Blades 57 direct the slurry into inlet device 53 forming a vortex around extraction device 50 that assists the sand for migrating from the periphery of tank 10 towards the extraction device 50. A modified jet pump shown in FIG. 3 is adapted for removing the slurry from the central portion of tank 10. First wall means defines a first frusto-conical compartment 59 in fluid communication along conduit 141 with a source of liquid under pressure. Compartment 59 is closed at the bottom by the circular plate 54 of inlet device 53 and is located concentrically within the cylinder 51. The frusto-conical compartment 59 extends upwardly with the narrower portion at the top connected to nozzle 60. Nozzle 60 accelerates the pressurized fluid flowing through frusto-conical compartment 59, creating a jet pump effect within cylinder 51 for extracting the slurry through inlet device 53 and the lower part of cylinder 51.

Second wall means defines a second frusto-conical compartment 61 generally symmetrical with compartment 59, and having the narrow end 62 directed downward. The lower end of compartment 61 is in fluid communication with the interior of the extraction apparatus 50 through a narrow portion 62 placed concentrically with respect to nozzle 60 and in the immediate vicinity of nozzle 60. The upper end of pipe 61 is welded to plate 52 of extraction device 50 and is connected to conduit 150 through an aperture 63. Slurry extracted through the jet pump effect by the extraction device 50 from the bottom of tank 10 enters the space enclosed by cylinder 51 through inlet device 53 and is discharged into compartment 61. From compartment 61 the slurry exits the extraction apparatus through conduit 150.

As shown in FIG. 1 de-sanding apparatus 20 is suspended by means of cable 70 and pulleys 71. One end of the cable 70 is attached to de-sanding apparatus 20 and the other end of cable 70 is attached to counterweight 75. The mass of counterweight 75 is slightly smaller than the mass of de-sanding apparatus 20 in order to minimize the torque on motor 77 and the impact when de-sanding apparatus 20 lands on the bottom of tank 10. Cable 70 is wound around drum 73 which turns around shaft 75 being driven by motor 77 or gravity. Motor 77 is coupled to drum 73 by means of pneumatic brake 76 which is operated by compressed air. Motor 77 is engaged to drum shaft 75 when compressed air is supplied via three-way valve 102 to the pneumatic brake 76. Conversely, motor 77 is disengaged when the air supply is interrupted and pneumatic brake 76 is vented to the atmosphere through conduit 162. Metal disc 72 secured to cable 70 moves vertically and operates limits switches 180 and 181 to ensure the automatic operation of the lifting arrangement described above.

Figure 6:
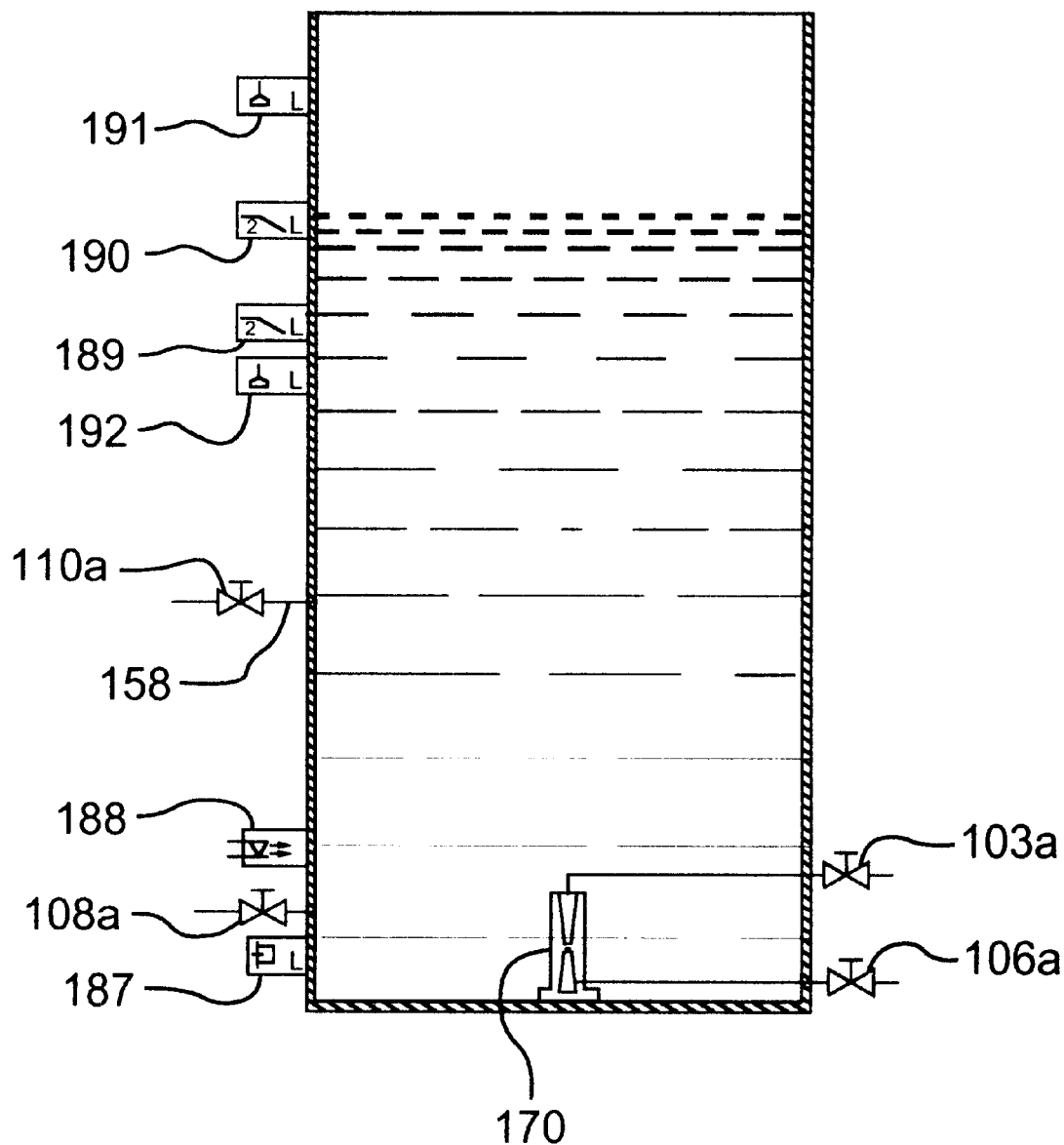
FIG. 6 is an elevational section through the water storage tank 160 according to the invention.

Referring to FIG. 6, the fluidizing liquid is stored in water storage tank 160, which is preferably cylindrical but may have a rectangular or square base. In the central area at the bottom of tank 160, extraction device 170 performs various functions as will be described in detail in the operation of the system. Extraction device 170 is identical with extraction device 50 and operates in various modes for sand removal from tank 10, clay removal from tank 10 and transfer of liquid from tank 10 to tank 160.

Figure 7A:
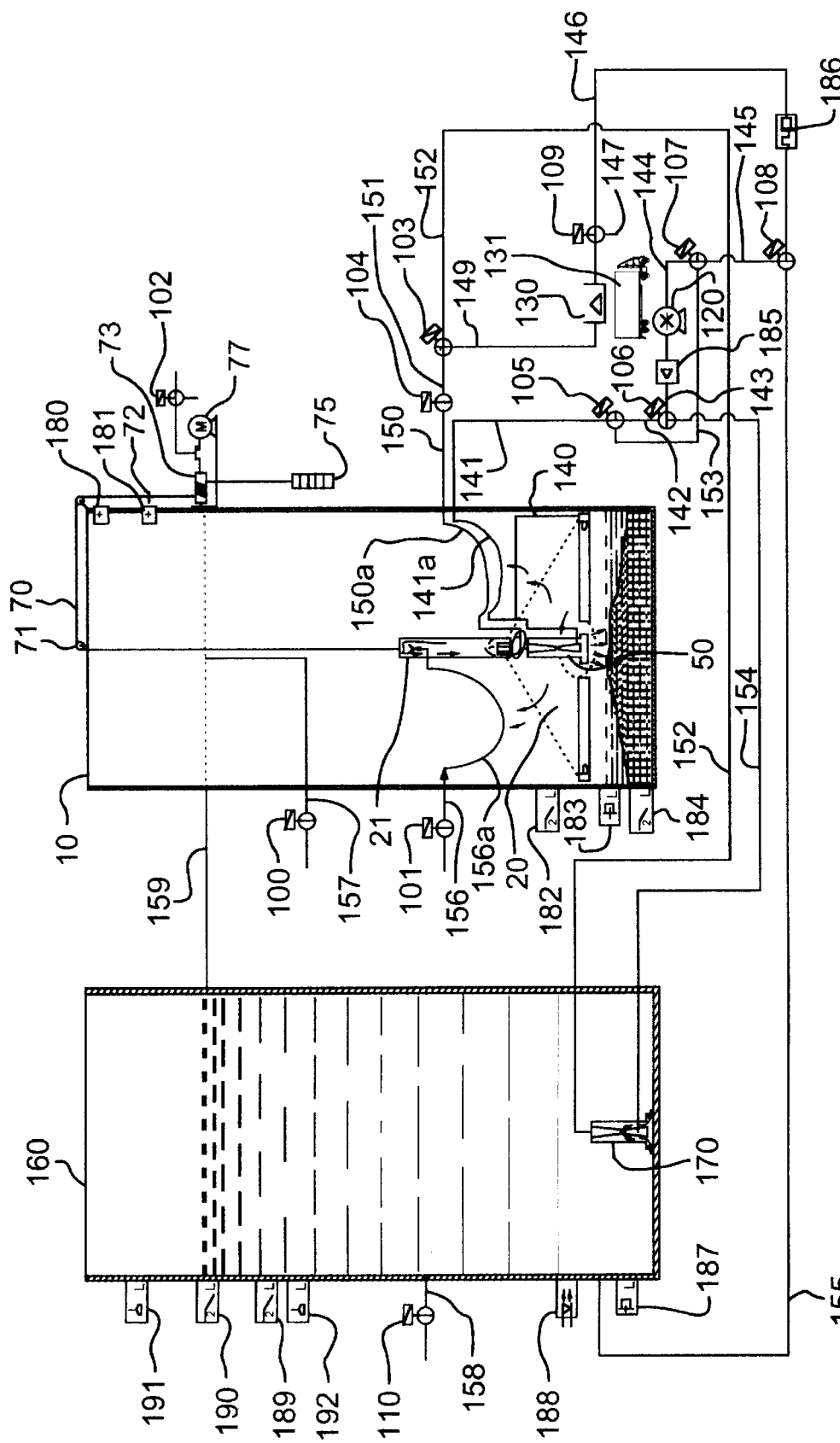
FIGS. 7A through 7F shows the configuration of the de-sanding apparatus of FIG. 1 during various phases of operation.
Figure 7B:
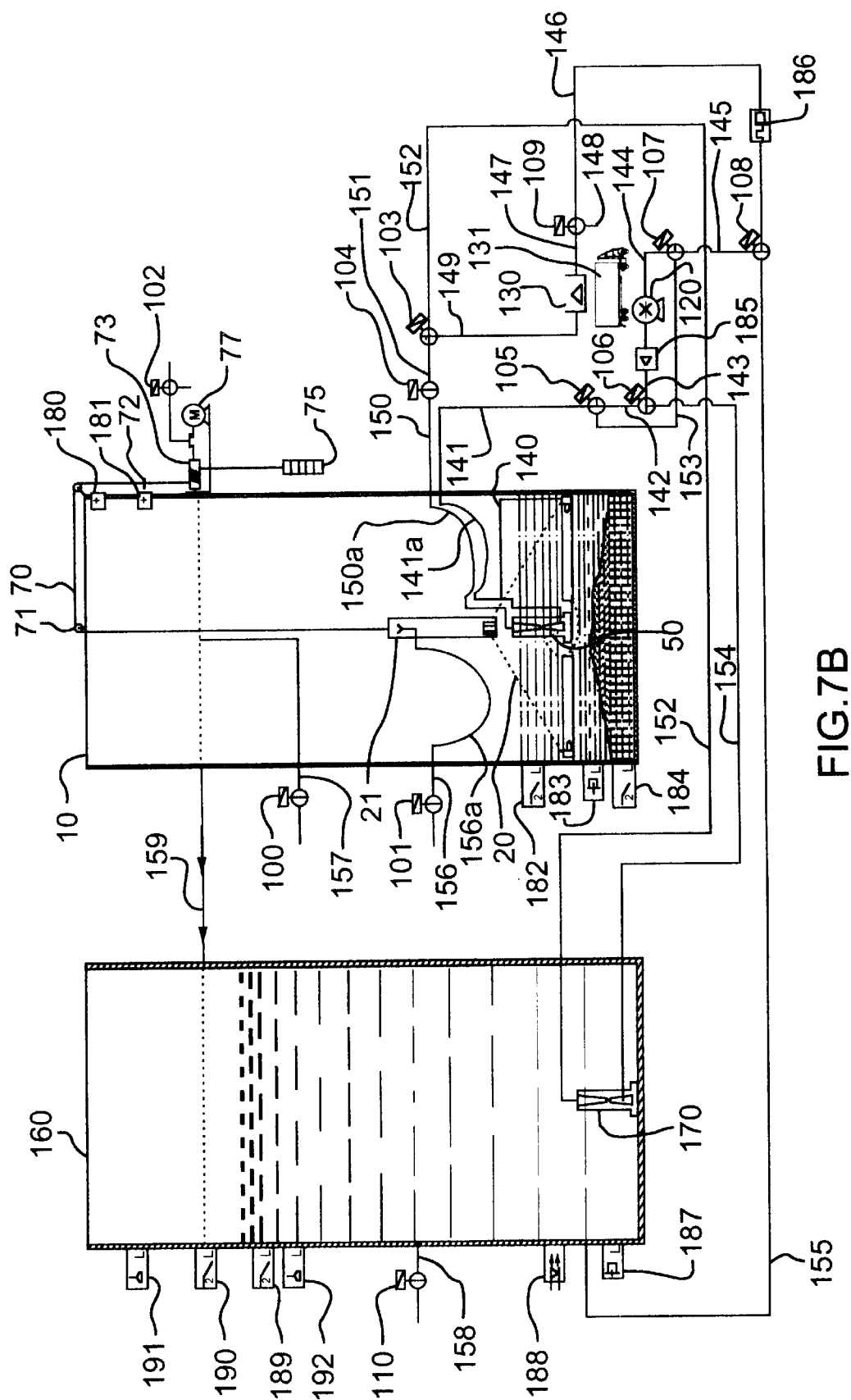

As shown in FIG. 7A pump 120, preferably a positive displacement type, is connected to de-sanding apparatus 20 in tank 10 or extraction device 170 in tank 160 on the discharge side. Pump 120 is also connected to extraction device 50, the lower portion of tank 160 and centrifuge 130 on the suction side. Pump 120 is connected in various pipe configurations in order to perform various functions. Referring to FIG. 7B, for flooding tank 10, pump 120 draws water from tank 160 via conduit 155, valve 108, conduit 145, valve 107, and conduit 144. Pump 120 delivers the water to the lower section of extraction device 50 through conduit 143, valve 106, conduit 142, valve 105, conduit 141 and flexible conduit 141*a*. During the de-sanding process of tank 10 (FIG. 7B) liquid under pressure is supplied by pump 120 to extraction device 50 through conduit 143, valve 106, conduit 142, valve 105, conduit 141 and the flexible portion 141*a* of conduit 141. Conduit 141 is connected to conduit 140 for delivering pressurized liquid from pump 120 to distribution chamber 32 of de-sanding apparatus 20.

Figure 7C:
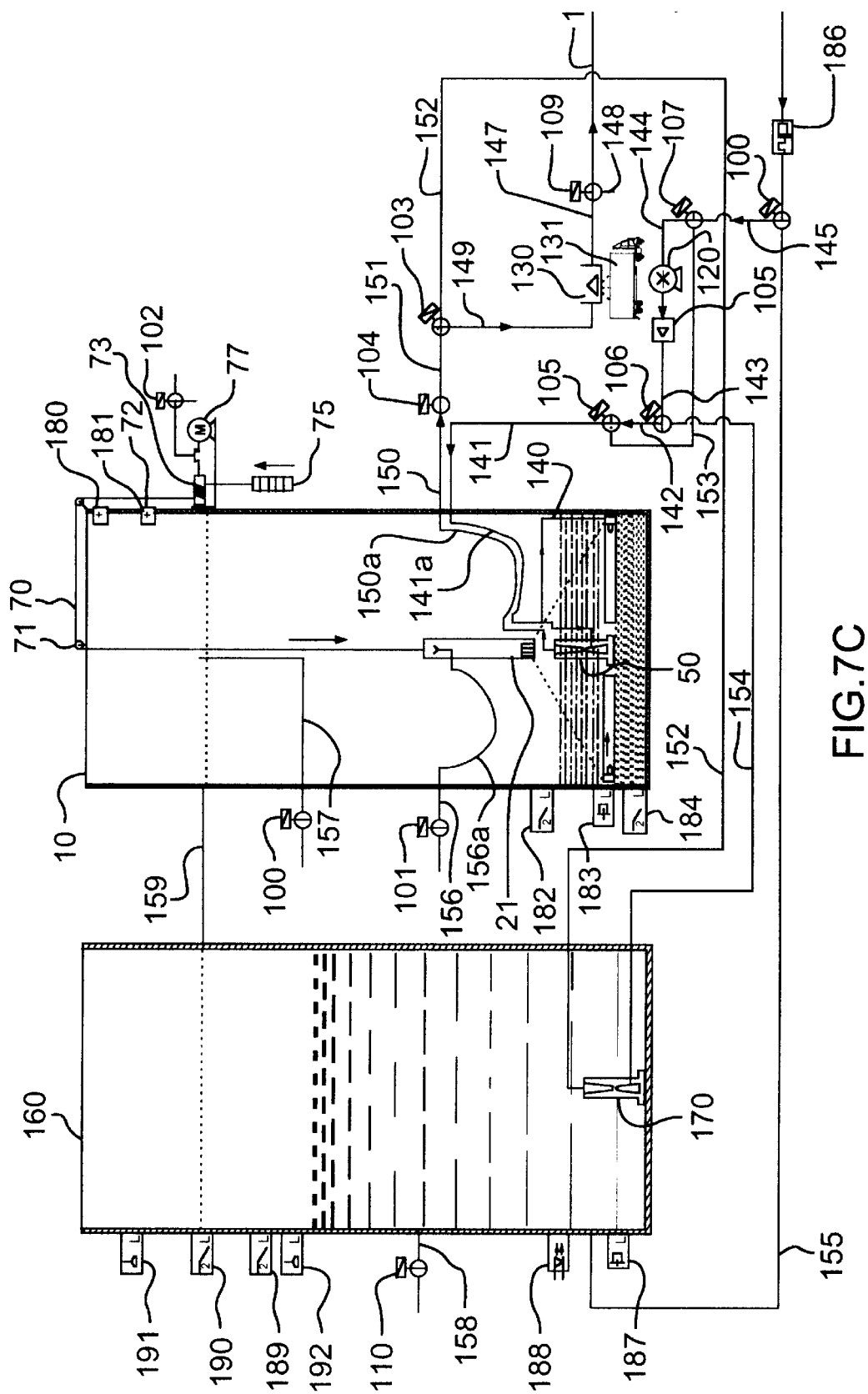

Conduit 141 has a flange 141*b* welded to it in the vicinity of perforated plate 31 of de-sanding apparatus 20. When de-sanding apparatus 50 is hoisted by motor 77, extraction device 50 is also lifted as perforated plate 31 encounters flange 141*b*. Conversely, when de-sanding apparatus 50 is lowered by the action of gravity, extraction device 50 can land on sand at a more elevated position than the bottom of de-sanding apparatus 50 as the perforated plate encounters no obstruction. Therefore extraction device 50 does not interfere with the descending movement of de-sanding apparatus 20 which can land on sand at a lower position than extraction device 50. This arrangement ensures that both distribution chamber 32 and extraction device 50 settle on the surface of the sand when sand forms a mound in the central region of tank 10, as shown in FIG. 7C.

Slurry exits de-sanding apparatus through conduit 150 with flexible portion 150*a*, flows through valve 104 and is directed by valve 103 through conduit 149 to centrifuge 130 for processing. Sand-free liquid returns to pump 120 through conduit 146, valve 108, conduit 145, valve 107 and conduit 144.

For removing the water from tank 10 upon completion of the de-sanding process (FIG. 7D) pump 120 draws water from the bottom of tank 10 through the lower section of extraction device 50, conduit 141, valve 105, conduit 153, valve 107 and conduit 144. Pump 120 then discharges the liquid to tank 160 via conduit 143, valve 106, conduit 154 and extraction device 170.

For removing clay from tank 160 (FIG. 7E) pump 120 draws water from tank 160 through conduit 155, valve 108, conduit 145, valve 107 and conduit 144. The liquid is then pumped to extraction device 170 through conduit 143, valve 106 and conduit 154. Clay containing water is evacuated by extraction device 170 and delivered to centrifuge 130 through pipe 152, valve 103 and conduit 149. Sand-free water that contains clay exits centrifuge 130 and is pumped into a well via conduit 148 and valve 109.

For sand removal from tank 160 (FIG. 7F), pump 120 draws liquid from the lower portion of tank 160 through conduit 155, valve 108, conduit 145, valve 107 and conduit 144. Pump 120 delivers the liquid under pressure to extraction device 170 though conduit 143, valve 106 and conduit 154. Slurry is then drawn into extraction device 170 and pumped to centrifuge 130 via conduit 152, valve 103 and conduit 149. After the system is primed the liquid returns from centrifuge 130 to pump 120 through conduit 147, valve 109, conduit 146, valve 108, conduit 145, valve 107 and conduit 144 whereas conduit 155 is isolated from pump 120. The upper portion of tank 10 is in fluid communication with crude oil tank 160 through conduit 159 which ensures the free flow of liquid between tank 160 and crude oil tank 10 in both directions.

Figure 8A:
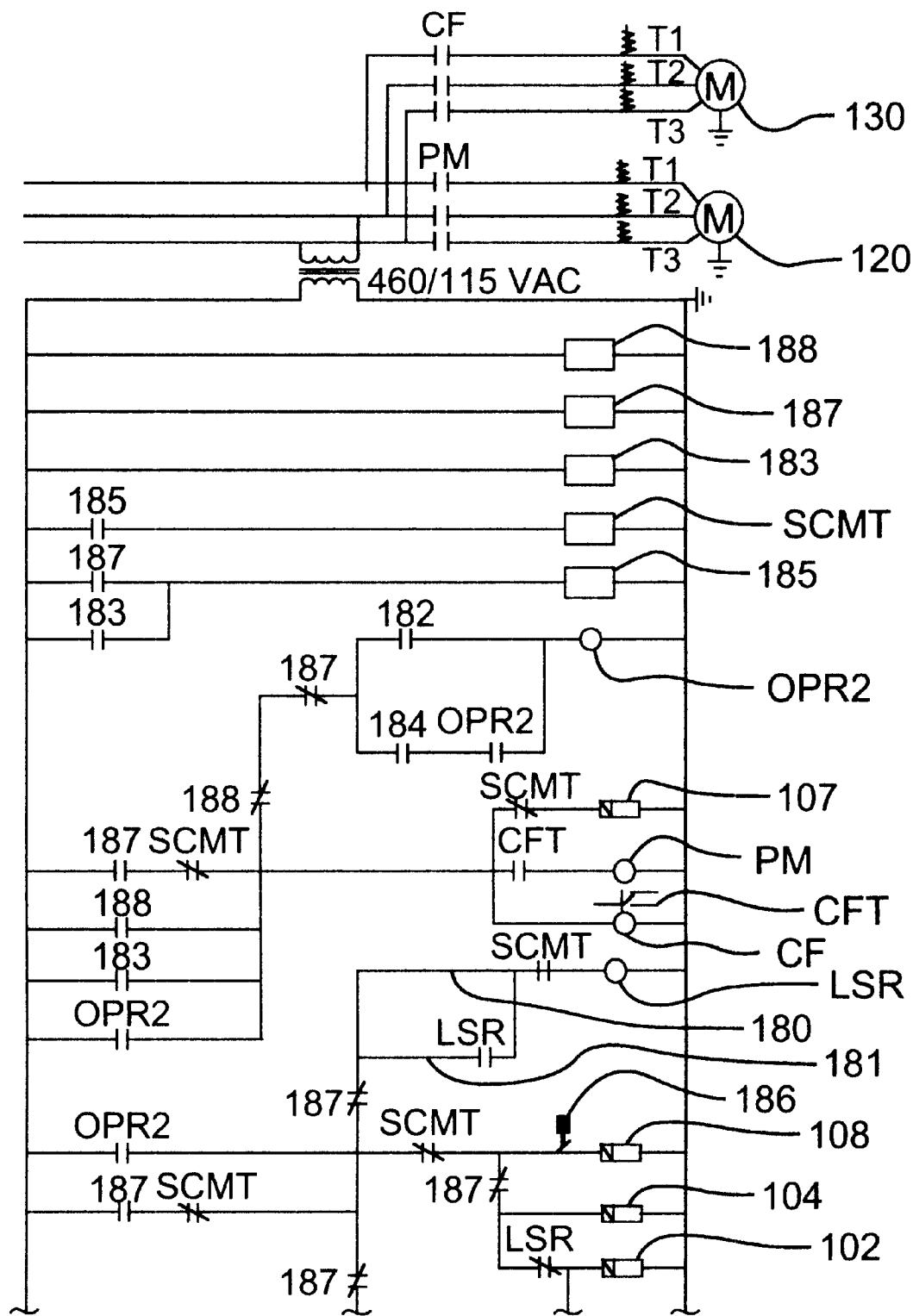
FIGS. 8a and 8b shows a control circuit for the de-sanding apparatus.
Figure 8B:
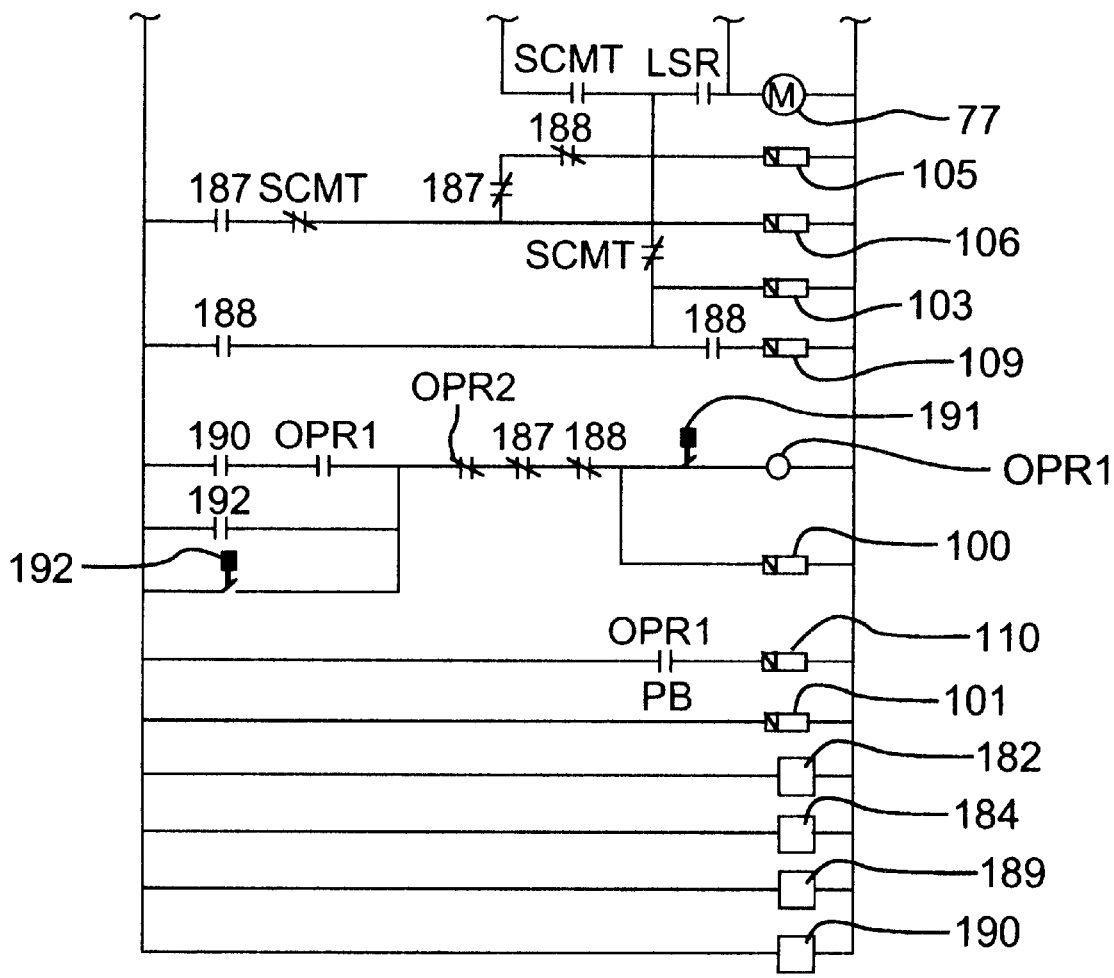

As shown in FIGS. 8A and 8B the de-sanding apparatus includes a control circuit for appropriately sequencing the process of de-sanding for both the crude oil tank and water storage tank and also clay removal from the water tank. The control circuit includes sand detectors 187 and sand detector 183 that may be operable preferably by means of radioactive indicators but also sonically, optically etc. to monitor the accumulation of sand in tank 160 and respectively tank 10. Sand sensors 187 and 183 provide a suitable signal to the control circuit for initiating the de-sanding cycles in tank 160 and tank 10 respectively.

Sand detectors 187 and 183 are installed at the lower portion of tank 160 and respectively tank 10 through nipples welded to the wall 181 of tank 160 and tank 10.

Sand detector 183 detects the build up of sand in tank 10 as the sand obstructs the beam emitted by sand detector 183. Then sand detector 183 initiates the flooding sequence of tank 10. Sand detector 183 operates in conjunction with oil sensor 182 which is operable preferably by means of a capacitance indicator. Sand detector 183 is placed at a level below de-sanding apparatus 20 when de-sanding apparatus 20 is in stand-by position. Oil probe 182 detects the presence of water when the lower region of tank 10 is flooded with water and starts the de-sanding process via oil probe relay OPR2.

Oil probe 182 operates in conjunction with sand content meter 185 which is a sensor preferably operated by means of a radioactive indicator. Sand content meter 185 monitors the concentration of sand in the slurry and selects the proper operating mode terminating the de-sanding process via timer SCMT. At the completion of the de-sanding process the concentration of sand in the slurry drops below a preset level. Timer SCMT prevents transitory conditions from adversely affecting the operation of sand content meter 185. Sand content meter 185 activates timer SCMT that ends the de-sanding cycle and initiates the water removal cycle with approximately 120 seconds delay. Limit switch relay LSR is activated by means of upper limit switch 180 and lower limit switch 181 which may be operated by means of optical, mechanical or magnetic means through plate 72. Limit switch relay LSR responds to sensors 181 and 180 and actuates various controllable devices to set the position of the de-sanding apparatus that is best suited for a particular operation cycle. Timer SCMT operates in conjunction with oil probe 184 which is installed at the bottom of tank 10 and is identical with oil probe 182. At the completion of the water removal cycle oil probe 184 detects the presence of oil and shuts down the unit by actuating the related devices. Oil probe 182 then places tank 10 in the stand-by mode shown in FIG. 7A until the sand accumulation triggers another cycle. Turbidity detector 188 installed on the wall of tank 160 is preferably operable by means of an optic indicator and monitors the accumulation of clay in tank 160. When the clay sediments build up in the lower portion of tank 160 their presence is detected by sensor 188 which activates various controllable devices which are best suited for the removal of clay from tank 160.

The clay removal cycle is selectable to be of a duration from 0 to 240 sec. Turbidity detector 188 incorporates a timer (not shown in FIG. 8) that is of an on-type delay being activated at the onset of the clay removal sequence. The timer begins to count a fixed timing interval at the start of the clay evacuation cycle and terminates the cycle by de-activating the related devices when it finishes counting.

Oil probes 190 and 189 mounted on tank 160 are identical with oil probes 182 and 184 and monitor the layer of oil formed in the upper portion of tank 160. When oil is detected by oil probe 189 relay OPR1 actuates the related devices in order to transfer the oil accumulated in tank 160 into tank 10. Relay OPR1 ends the oil transfer when water reaches oil probe 190. Oil probes 190 and 189 operate in conjunction with level switch 191 and level switch 192.

Level switches 191 and 192 may be operable optically, magnetically, sonically, electronically etc. to provide a signal to the control unit and activate the appropriate devices when the liquid level in tank 160 exceeds or drops below a preset level. All sensors described above may be threaded into the vertical wall of tank 160 and respectively tank 10 through couplings welded to said walls.

In accordance with a preferred embodiment of the invention, the system may be operated as follows:

Tank 10 is initially filled with clean crude oil. As shown in FIG. 7A crude oil containing sand is admitted into tank 10 through conduit 156 and valve 101 which is manually opened by means of push-button PB (FIG. 8B). The liquid flows through the flexible section 156a of conduit 156 and enters the distributor 21 that directs the flow upwards. The liquid exits the enlarged end 156b having a reduced velocity and it is deflected downwards by the top of distributor 21 which absorbs the impact of the liquid jet. At the same time the flow is uniformly distributed towards the lower portion of the distributor 20. The liquid then enters the annular opening 27a in vortex generator 26 and exits through the aperture 30 in a rotary motion (FIG. 2). The swirl formed by vortex generator 26 promotes the migration of sand towards the eye of the vortex and its sedimentation in the central area below the distributor 21. Most of the sand is collected at the bottom of the tank 10 around extraction apparatus 50 from where the sand can be readily removed. The flow of liquid is then reversed and is directed through the perforated plate 31 of de-sanding apparatus 20. The perforations of plate 31 distribute the flow of liquid uniformly and create a quiet zone above the de-sanding apparatus 20 for separation by gravity. At the same time perforated plate 31 allows the descent of sand separated from oil in the upper portion of tank 10 and its sedimentation at the bottom of tank 10 for subsequent disposal. Crude oil is then transferred to other storage tanks connected in series with tank 10 through conduit 157 and valve 100.

The layer of sand collected at the bottom of tank 10 grows in thickness and obstructs the radioactive beam emitted by sand detector 183. Sand detector 183 is activated to energize pump 120 and valve 107. As shown in FIG. 7B pump 120 draws water from tank 160 via conduit 155, valve 108, conduit 145, valve 107 and conduit 144. Pump 120 floods the lower portion of tank 10 through conduit 143, valve 106 conduit 142, valve 105, conduit 141, flexible conduit 141a and the lower compartment 59 of extraction device 50. The oil is displaced from the bottom of the tank 10 towards an area relatively isolated from de-sanding apparatus 20 in order to preclude it from interfering with the de-sanding cycle that follows.

The oil-water interface moves upwards until it reaches oil probe 182. The signal provided by sensor 182 configures the control circuit for initiating the de-sanding cycle.

Referring to FIG. 7C and FIGS. 8A and 8B oil probe 182 energizes oil probe relay OPR2 that activates valve 102 in order to interrupt the compressed air supply to the pneumatic brake 76 and vent conduit 161 to the atmosphere. Because the pneumatic brake 76 is de-activated drum 73 is released and de-sanding apparatus 20 descends to the bottom of the tank 10 by gravity. The flexible conduits 156*a,* 150*a* and 141*a* allow the free movement of de-sanding apparatus 20. Metal disc 72 secured to the cable 70 moves upwardly as the de-sanding apparatus descends. Metal disc 72 operates the upper limit switch 180 which closes its internal contact in order to prepare the hoisting motor 77 for the next mode of operation.

Oil probe relay OPR2 also activates valve 108 via pressure switch 186 which closes its contact when liquid discharged by centrifuge 130 builds up pressure in conduit 146. Valve 108 connects pump 120 with centrifuge 130 through conduit 147, conduit 146, valve 108, conduit 145, valve 107 and conduit 144. Oil sensor 182 simultaneously energizes valve 104 and centrifuge 130. Pneumatic timer CFT of contactor CF activates pump 120 with approximately 1 min. delay in order to allow centrifuge 130 to reach the required speed before pump 120 is activated. Then pump 120 is energized and draws liquid from centrifuge 130 delivering the liquid under pressure through conduit 143, valve 106, conduit 142, valve 105, conduit 141, flexible conduit 141*a* and conduit 140 to the distribution chamber 32 of de-sanding apparatus 20 and through conduit 141*a* to extraction device 50.

From distribution chamber 32 the liquid exits through nozzles 38 which provide a slanted horizontal jet pattern at relatively low pressure. The jets are impinging on blades 39 that direct the flow towards the sand extraction device 50. The sand deposited at the bottom of tank 10 is agitated and fluidized by the jets emerging from nozzles 38. As sand becomes suspended in the liquid, the flow of liquid between blades 39 directs the slurry towards the extraction device 50. In the vicinity of extraction device 50 a swirl is formed by the circular pattern of flow created by specially designed inlet 53. The slurry migration is assisted both by the radial displacement of the liquid and the centripetal forces created within the vortex. At the same time a depression is created below the inlet 53 of extraction device 50. This cavity promotes the migration of sand from the periphery of de-sanding apparatus 20 towards the central area for disposal. Thus sand removed from the cavity causes the layers of sand in the vicinity of the cavity to collapse towards the core of the cavity from where they are extracted through the inlet of the extraction device 50.

The liquid under perforated plate 31 of de-sanding apparatus 20 undergoes oil-water separation and small oil droplets coalesce in contact with perforated plate 31. Larger oil globules have enhanced buoyancy and rise above de-sanding apparatus 20 joining the oil in tank 10. This results in cleaner liquid and sand and enhanced performance of de-sanding apparatus 20. Liquid under pressure is also directed to extraction device 50 via conduit 141*a*. The liquid enters inlet 53 of extraction device 50 and travels through the pressure nozzle 60. Suction created by the high-velocity liquid within cylinder 51 draws the slurry up through the inlet 53 and discharges it through the compartment 61. Discharge of liquid (through conduit 150*a,* conduit 150, valve 104, conduit 151, valve 103, and conduit 149 to centrifuge 130) occurs at a pressure greater than the suction stream but lower than the operating liquid in conduit 141*a*. Sand separated from liquid in centrifuge 130 is dumped into a truck 131 or deposited in a specially designated area for subsequent disposal. Liquid free of sand is then re-circulated for continuing the de-sanding process in tank 10.

The evacuation of sand from the bottom of the crude oil tank 10 causes the concentration of the slurry to be gradually reduced. Sand content meter 185 is energized by the oil probe relay OPR2 at the beginning of the de-sanding process of tank 10 and monitors continually the sand concentration in the slurry. Sand content meter 185 energizes sand content meter timer SCMT when the amount of sand in the slurry drops below the preset limit. SCMT then times out and configures the control circuit for the water removal cycle.

Figure 7D:
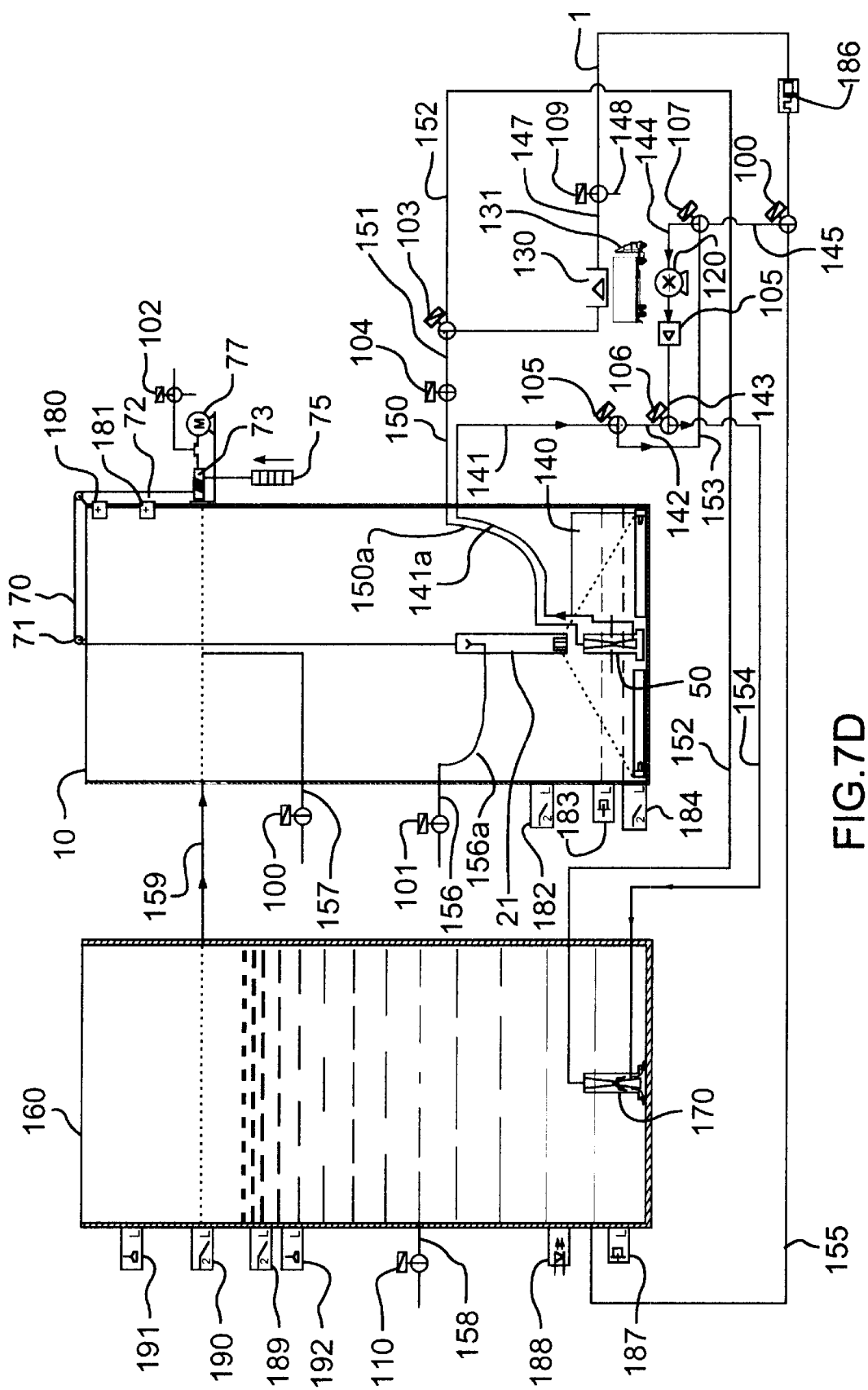

As shown in FIG. 7D and FIGS. 8A and 8B sand content meter timer SCMT de-energizes valves 108 to isolate pump 120 from centrifuge 130. Timer SCMT also de-energizes valve 107 and centrifuge 130 and energizes valve 105 to connect the suction side of pump 120 to extraction device 50. Sand content timer SCMT maintains pump 120 energized in and activates valve 106 order to transfer the liquid into tank 160. From the lower portion of tank 10 the liquid is drawn through extraction device 50, conduit 141*a,* conduit 141, valve 105, conduit 153, valve 107 and conduit 144. Pump 120 discharges the liquid to tank 160 via conduit 143, valve 106 conduit 154 and de-sanding apparatus 170. As the water level in tank 160 increases, the oil is displaced from the top of tank 160 and flows back into tank 10 through conduit 159 for recovery. SCMT simultaneously energizes limit switch relay LSR that in turn activates hoisting motor 77. As drum 73 is rotated by motor 77 cable 70 raises de-sanding apparatus towards its stand-by position. Metal disc 72 on the cable 70 descends and upper limit switch 180 opens its internal contact. When metal disc 72 reaches the lower limit switch 181 the internal contact of switch 181 opens and relay LSR is de-energized. LSR deactivates motor 77 and de-energizes valve 102 that rotates in order to supply compressed air to pneumatic brake 76. Drum 73 is immobilized by pneumatic brake 76 and de-sanding apparatus 20 remains suspended within tank 10.

At the completion of the water removal cycle the oil-water interface operates oil sensor 184 that de-energizes oil probe relay OPR2. Relay OPR2 causes pump 120 to stop. Valves 106 and 105 are also de-energized and return to their initial position shown in FIG. 7A.

Figure 7E:
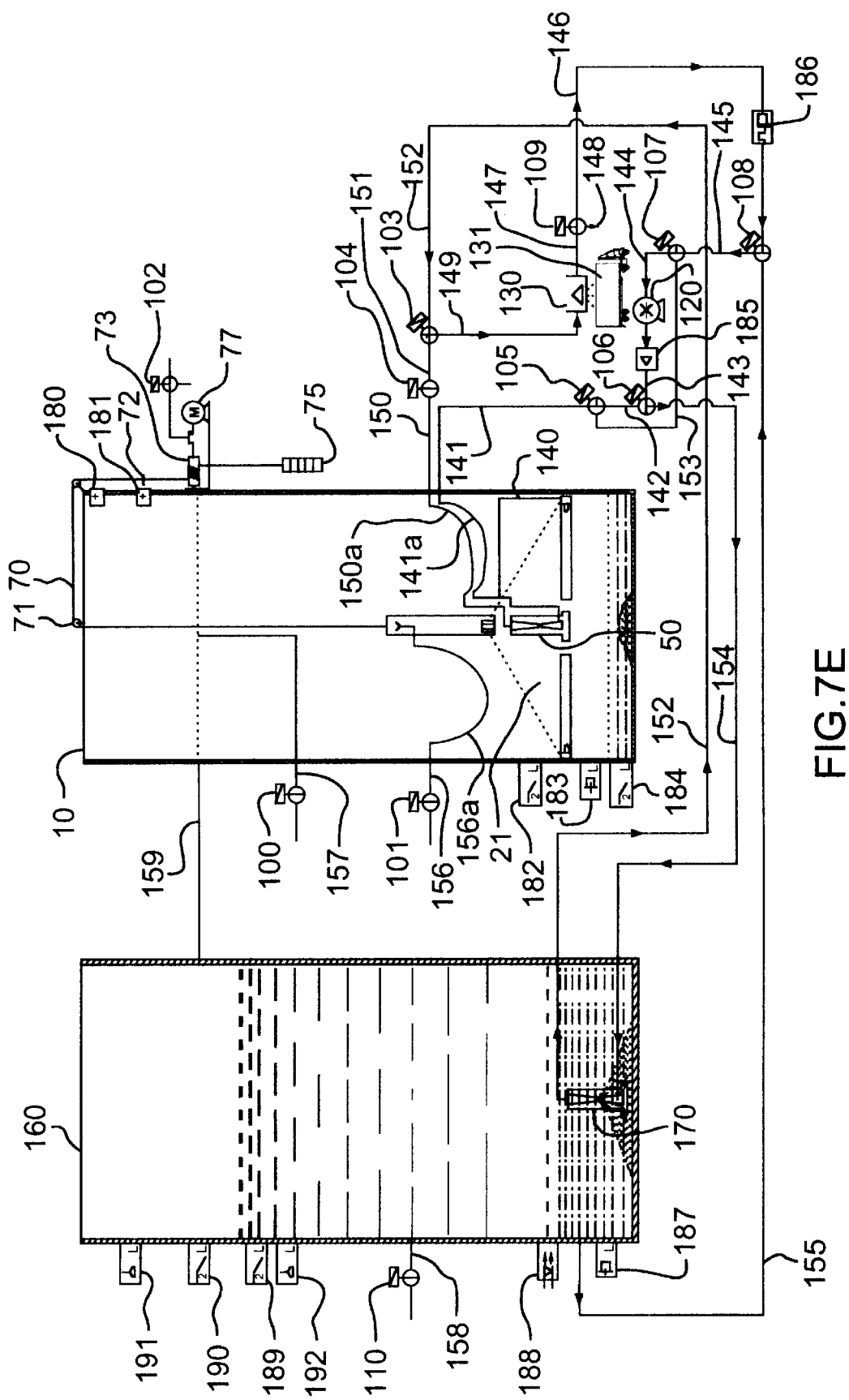

Water recovered in tank 160 from tank 10 contains a certain amount of fines, particularly clay, that cannot be removed by centrifuge 130. Due to ample residence time in tank 160 the fines settle at the bottom and form a layer whose thickness grows gradually. Referring to FIG. 7E and FIG. 8 turbidity detector 188 is operated when the layer of fines reaches sensor 188 and configures the control circuit for the clay disposal cycle.

Sensor 188 energizes valves 107 and valve 106. The suction side of pump 120 is connected to water storage tank 160 through conduit 155, valve 108, conduit 145, valve 107 and conduit 144. Sensor 188 also energizes valve 103 and valve 109 connecting extraction device 170 to centrifuge 130 through conduit 152, valve 103 and conduit 149. The discharge side of pump 120 is put in fluid communication with extraction apparatus 170 through conduit 143, valve 106 and conduit 154. Clay sensor 188 actuates centrifuge 130 and pump 120 with 1-minute delay via timer CFT. The liquid is circulated as shown by arrows in FIG. 7E. Liquid containing clay and a small amount of sand settled in the vicinity of the extraction device 170 is drawn into extraction apparatus 170 due to the venturi effect and delivered to centrifuge 130 which extracts and recovers the sand. The liquid exiting centrifuge 130 is then pumped through conduit 147, valve 109 and conduit 148 into a well for disposal.

A timer (not shown in FIGS. 8A and 8B) incorporated within clay detector 188 begins a counting sequence at the onset of the clay disposal cycle. At the end of the time interval determined by the timer, detector 188 is operated and causes pump 120, centrifuge 130 and valves 107,106, 103 and respectively 109 to be de-energized.

A certain amount of water is removed from tank 160 during the clay removal cycle and tank 10 requires replenishing. Level switch 192 is operated when the liquid level in tank 160 drops and oil probe relay OPR1 is energized.

Relay OPR1 energizes valve 110 which opens and supplies water under pressure to tank 160. At the same time valve 101 opens to allow the transfer of liquid from tank 10 to other crude oil tanks (not shown). The level of liquid in tank 160 rises and liquid flows from tank 160 to tank 10 through conduit 159. Excess liquid from tank 10 is transferred through valve 101 and conduit 156 to other crude oil tanks.

When water reaches oil probe 190 the replenishing cycle of tank 160 is completed sensor 190 causes valves 110 and V101 to be de-energized. Level switch 191 prevents the level in tank 160 and tank 10 from rising above the level at which switch 191 is placed. In case the level of liquid exceeds the predetermined level due a malfunction malfunctions of probe 190 switch 191 opens its contact and de-energizes valve V1 interrupting the supply of water under pressure to tank 160.

Small amounts of sand may be present in the liquid transferred from tank 10 to tank 160 during the during the water removal cycle. Sand is deposited at the bottom of tank 160 in the vicinity of the extraction device 170 and it is normally evacuated during the clay removal cycle or during the flooding mode tank 10.

Figure 7F:
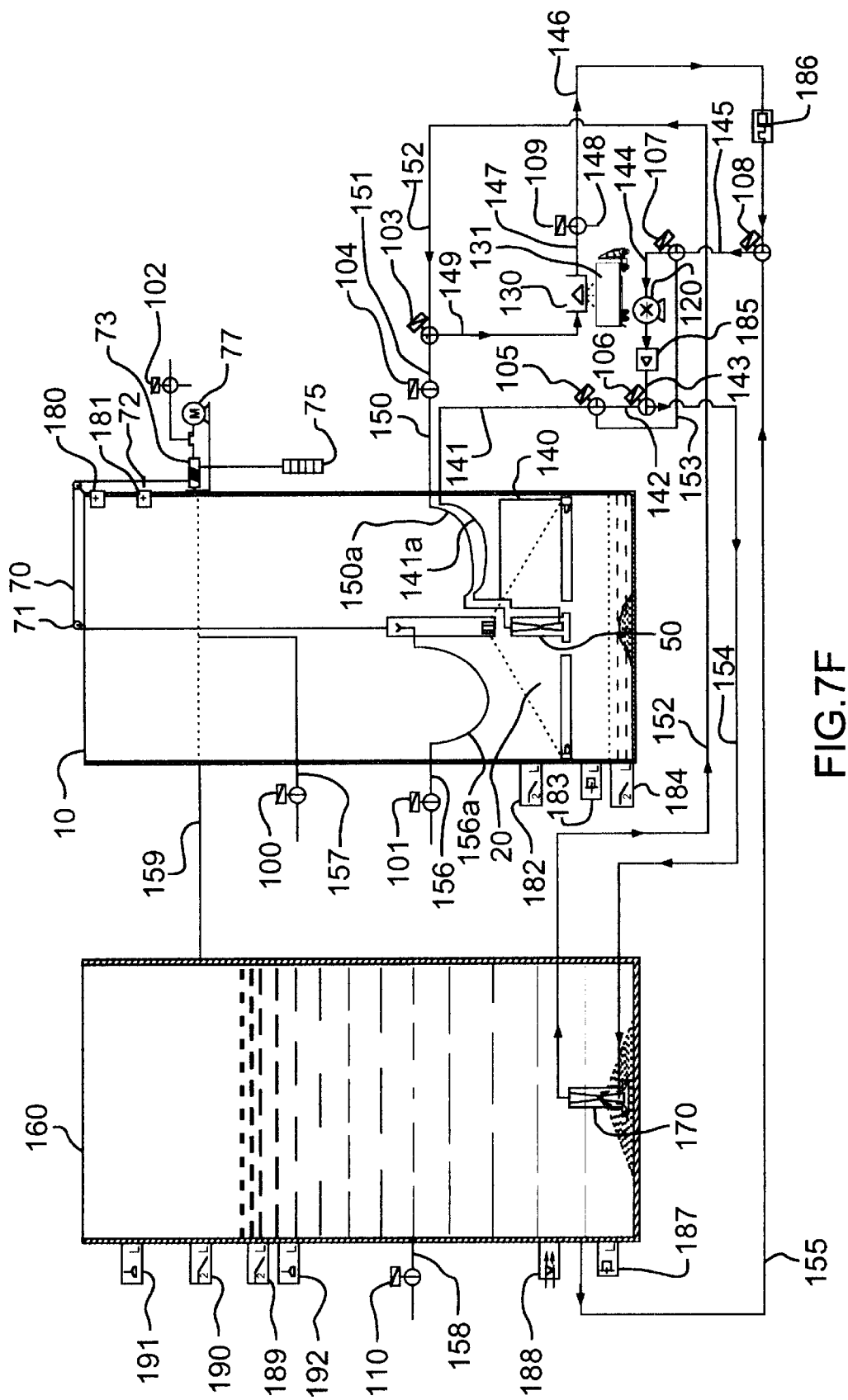

In case the crude oil contains only sand there are no other fines transferred to tank 160. Turbidity detector 188 will not be operated and a sand detector 187 is required for initiating a sand disposal cycle from tank 160. Referring to FIG. 7F and FIG. 8, sand detector 187 operates in the same fashion as sand detector 183 when it detects the presence of sand in its vicinity. Sand detector 187 causes valve 107 to be energized. Valve 107 connects pump 120 to tank 160 through conduit 155, valve 108, conduit 145 and conduit 144. Valves 106 and 103 are also energized connecting pump 120 to extraction device 170 and centrifuge 130. Contactor CF is energized and starts centrifuge 130. At the same time contactor CF actuates pneumatic timer CFT which energizes pump 120 with 1 min. delay. Pump 120 circulates the liquid through extraction device 170 which removes the slurry from tank 160 and delivers the slurry to the centrifuge 130.

Initially there is no liquid pressure in conduit 146 that connects centrifuge 130 to valve 108 and pump 120 is primed with liquid from tank 160. Liquid exiting centrifuge 130 builds up a certain pressure in conduit 146 and actuates pressure switch 186 that energizes valve 108 to direct the liquid to pump 120. The suction side of pump 120 is connected to centrifuge 130. Liquid is then circulated as shown in FIG. 7F. At the completion of the de-sanding process in tank 160, sand content meter 187 energizes timer SCMT that begins a counting sequence. When timer SCMT times out pump 120, centrifuge 130 and valves 108, 107, 106 and 103 are de-energized.

Excess oil is removed from tank 160 by means of probe 189, which is operated when it detects the presence of oil at its level. Sensor 189 energizes oil probe relay OPR1 which activates valve 110 and valve 101 for transferring the oil from tank 160 to tank 10 via conduit 159.

When the oil-water interface reaches the oil sensor 190 relay OPR1 is de-energized and valves 110 and 101 are de-activated. The supply of water under pressure is interrupted and tank 10 is isolated from other crude oil tanks. Valve 101 may then be opened manually for supplying oil to tank 10. Low liquid level in tank 160 is detected by level switch 192 that energizes oil probe relay OPR1 in order to activate valve 110. Liquid under pressure is supplied to tank 160 and the level rises until water reaches oil probe 190 that de-energizes valve 110 and interrupts the flow of water to tank 160. Level switch 191 detects high level in tank 160 and overrides level switch 189 to prevent inadvertent supply of water to tank 160 in case level switch 192 malfunctions.

In summary, a eferred aspect of the invention includes
The method of de-sanding the crude oil tank in several steps as follows:

a) The step of introducing the oil into the crude oil tank by reversing the flow of crude oil in a distributor that absorbs the impact of the fluid entering the tank and then forming a vortex in the lower part of the distributor in order to cause the fines to migrate towards the eye of the vortex and deposit in the central area of the crude oil tank.

b) The step of passing the crude oil through a perforated plate towards the upper portion of the crude oil tank in order to achieve further separation by gravity in a quiet zone above the perforated plate of the de-sanding apparatus.

c) The step of transferring the crude oil after removing the fines to adjacent crude oil tanks in order to minimize the deposits and maintenance in said tanks.

d) The step of flooding the crude oil with fluidizing liquid prior to the de-sanding process in order to displace the oil above the de-sanding apparatus and minimize the contamination of the recovered sand with oil.

e) The step of flooding the crude oil tank with water to reduce the viscosity of the medium below the de-sanding apparatus and thus to facilitate the migration of sand towards the central portion of the tank for extraction.

f) The step of lowering de-sanding apparatus onto the sand deposited at the bottom of the crude oil tank prior to de-sanding the said tank in order to place the nozzles and the extraction device onto the surface of the tank for minimizing agitation and emulsification of oil during the de-sanding process, assisting the sand to migrate towards the centre of the tank, creating a depression at the bottom of said tank that causes layers of sand in the vicinity of the said depression to collapse and further migrate towards the centre.

g) The step of assisting the separation of oil from water during the de-sanding process in order to minimize the oil contamination of sand by means of coalescing the oil droplets as they adhere to the perforated plate of the de-sanding apparatus and form larger globules that have enhanced buoyancy.

h) The step of lifting the de-sanding apparatus upon completion of the de-sanding process in order to prevent the nozzles and the extraction device from being buried in the sand when the unit is on stand-by.

i) The step of recovering the water for reuse and therefore minimize the water consumption upon completion of the de-sanding process.

j) The step of removing fines other than sand from the water storage tank for ensuring a relatively clean fluidizing liquid.

k) The step of removing sand that may accumulate in the water storage tank.

l) The step of replenishing the water storage tank upon completion of evacuation of fines from said tank.

m) The step of removing oil that may accumulate at the upper portion of the water storage tank.

2) The method of automatically removing the fines from tank 10 by means of an automated process disclosed herein.

Although preferred embodiments of the invention have been described herein in detail, it will be understood by those skilled in the art that variations may be made thereto without departing the spirit of the invention or the scope of the appended claims.

What is claimed is:

1. An apparatus for removing fines from the bottom inside of a tank, comprising:

an extraction device having
        wall means defining an internal chamber,
        vacuum means within the chamber which, when activated, lowers the pressure within the chamber,
    an inlet device adjacent the bottom of the extraction device, the inlet device being adapted to be adjacent fines accumulated on the bottom of the tank, the inlet device acting, when the vacuum means is activated, to move fines toward the internal chamber by superimposing on the moving fines an inwardly convergent motion, and
    operating means for 1) lowering the extraction device toward fines accumulated on the bottom of the tank, and 2) activating the vacuum means,
    a distributor located above said extraction device for defining a quiet zone above the extraction device to further facilitate the separation of fines from the fluid.

2. The apparatus claimed in claim 1, in which the vacuum means incorporates a jet pump.

3. The apparatus claimed in claim 1, in which the vacuum means includes: a first compartment defined within said chamber, delivery conduit means for providing pressurized fluid to said first compartment, a nozzle communicating with the interior of said first compartment, through which nozzle the contents of the first compartment can be expelled, the nozzle communicating with the interior of the chamber; a second compartment defined within said chamber and having, adjacent the nozzle, an opening through which the expelled contents of the first compartment can be received, thereby creating a jet pump effect which entrains material from within the chamber and lowers the pressure therein; and second conduit means for conducting material away from the second compartment.

4. The apparatus claimed in claim 1, in which the inlet device includes a plurality of similar blades peripherally spaced apart and curved so as to generate a vortex which assists the inward migration of fines.

5. The apparatus claimed in claim 4, in which the operating means includes a cable and pulley means by which the extraction device is centrally suspended within the tank, in a vertically movable manner.

6. The apparatus claimed in claim 1, the distributor further having:

a distributor wall means defining an enclosed distributor space,
    ducting conduit means for ducting fluid to the enclosed distributor space, said ducting conduit means having at its downstream extremity, within said enclosed distributor space, an outwardly flared portion the effect of which is to decrease the speed with which the fluid enters the enclosed distributor space;
    a vortex generating means by which fluid in the distributor is discharged therefrom in a swirling motion to facilitate the separation of fines from the fluid.

7. The apparatus claimed in claim 6, which further comprises:

a perforated plate secured to the distributor, the perforated plate extending outwardly and downwardly from the distributor to define said quiet zone.

8. The apparatus claimed in claim 7, in which the plate is frusto-conical in configuration, and is connected to the distributor, said vortex generating means including a plurality of similar blades peripherally spaced apart and curved.

9. The apparatus claimed in claim 8, further comprising:

a substantially annular distribution chamber defined by appropriate further wall means at the outer periphery of the plate;
    a plurality of jet nozzles communicating with the annular distribution chamber, all of said nozzles being directed generally inward;
    and pressurizing means for the annular distribution chamber, said pressurizing means including a pump, and pipe means connecting the pump with the annular distribution chamber.

10. The apparatus claimed in claim 9, in which the vacuum means includes: a first compartment defined within said chamber, delivery conduit means for providing pressurized fluid to said first compartment, a nozzle communicating with the interior of said first compartment, through which nozzle the contents of the first compartment can be expelled, the nozzle being accessible to the interior of the chamber; a second compartment defined within said chamber and having, adjacent the nozzle, an opening by which the expelled contents of the first compartment can be received, thereby creating a jet pump effect which entrains material from within the chamber and lowers the pressure therein; and discharge conduit means for conducting material away from the second compartment.

11. An apparatus for removing fines from the bottom inside of a tank, comprising:

an extraction device adapted to be adjacent fines accumulated on the bottom of the tank, and to remove the fines along a pathway by creating a vacuum effect;
    a distributor within the tank and vertically aligned above the extraction device, the distributor having:
    a distributor wall means defining an enclosed distributor space,
    ducting conduit means for ducting fluid to the enclosed distributor space, said ducting conduit means having at its downstream extremity, within said enclosed distributor space, an outwardly flared portion the effect of which is to decrease the speed with which the fluid enters the enclosed distributor space;
    a vortex generating means by which fluid in the distributor is discharged therefrom in a swirling motion to facilitate the separation of fines from the fluid.

12. The apparatus claimed in claim 11, which further comprises:

a perforated plate secured to the distributor, the perforated plate above the extraction device a quiet zone, in which is further facilitated the separation of fines from the fluid.

13. The apparatus claimed in claim 12, in which the plate is frusto-conical in configuration, and is connected to the distributor, said vortex generating means including a plurality of similar blades peripherally spaced apart and curved.

* * * * *